UNITED STATES PATENT OFFICE.

CARL DUISBERG, OF ELBERFELD, GERMANY, ASSIGNOR TO THE FARBENFABRIKEN, VORMALS FR. BAYER & CO., OF SAME PLACE.

BLUE DYE.

SPECIFICATION forming part of Letters Patent No. 525,492, dated September 4, 1894.

Application filed April 21, 1894. Serial No. 508,521. (Specimens.) Patented in Germany November 19, 1885, No. 38,802; in England November 24, 1885, No. 14,424; in France December 19, 1885, No. 173,042, and in Italy May 26, 1886, XX, 19,967, XXXIX, 328.

*To all whom it may concern:*

Be it known that I, CARL DUISBERG, chemist, doctor of philosophy, a subject of the Emperor of Germany, residing at Elberfeld, Prussia, Germany, (assignor to the FARBENFABRIKEN, VORMALS FR. BAYER & CO., of Elberfeld,) have invented a new and useful Improvement in the Manufacture of a Blue Dye-Stuff, insoluble in water, which may be produced in substance or on the fiber, (for which the FARBENFABRIKEN, VORMALS FR. BAYER & CO., have already obtained Letters Patent in Germany, No. 38,802, dated November 19, 1885; in England, No. 14,424, dated November 24, 1885; in France, No. 173,042, dated December 19, 1885, and in Italy, XX, No. 19,967, XXXIX, No. 328, dated May 26, 1886;) and I give in the following a full, clear, and exact description thereof.

My invention relates to the production of a blue dye-stuff, insoluble in water and resulting from the action of one molecular proportion of tetrazodiphenolether salt on two molecular proportions of beta naphthol in an alkaline solution, which dye may be produced as a substance or on the fiber.

In carrying out my invention practically I proceed as follows: 24.4 parts, by weight, of dianisidin dissolved in water with the addition of sixty parts, by weight, of hydrochloric acid (20° Baumé) are converted in the well known manner into the tetrazo compound by means of fourteen parts, by weight, of sodium nitrite. The thus formed tetrazo compound solution is allowed to flow into a solution of thirty-eight parts, by weight, of the sodium salt of beta naphthol in water, with the addition of one hundred and fifteen parts, by weight, of sodium carbonate and a large quantity of ice. During the operation the mixture is well stirred. The formation of the dye-stuff, which separates in blue flakes, is soon completed and, after some time, the mixture is heated at about 80° centigrade. The dye is filtered off, washed with hot water, dried and powdered. The dye-stuff forms a darkish-brown powder, insoluble in cold and hot water, nearly insoluble in alcohol. By dissolving it in concentrated sulfuric acid a blue solution is obtained, which separates bluish-violet flakes on the addition of ice-water. When dissolved in suitable solvents, as for example albumen, the dye can be used for printing purposes, giving clear blue shades. I have found that the same die can also be produced directly on the fiber for instance in the following manner: The cotton material, for example is padded with a solution prepared by dissolving forty-five parts, by weight, of beta naphthol, seventy-five parts, by weight, of soda lye (22° Baumé) and one hundred and thirty-five parts, by weight, of Turkey red oil in three hundred parts, by weight, of water. The material is dried and subsequently printed with a printing paste, containing forty-five parts, by weight, of a "tetrazodiphenolether solution" and twenty-seven parts, by weight, of a thickening material. After printing the material is dried, soaped, washed and dried again. The aforesaid "tetrazodiphenolether solution" is prepared by dissolving 18.3 parts, by weight, of dianisidin in ninety parts, by weight, of water with the addition of 31.8 parts, by weight, of hydrochloric acid (22° Baumé) and one hundred and fifty parts, by weight, of ice, and subsequently adding twenty-one parts, by weight, of sodium nitrite dissolved in ninety parts, by weight, of water and finally filtering the thus obtained tetrazo-solution. In this manner the above described blue dye-stuff is fixed as a precipitate, insoluble in water on the fiber forming clear blue shades.

Having now described my invention and in what manner the same is to be performed, what I claim as new, and desire to secure by Letters Patent, is—

1. The process for the production of a blue dye-stuff, consisting in the combination of one molecular proportion of tetrazodiphenolether salt with two molecular proportions of beta naphthol in presence of an excess of alkali.

2. The process for the production of blue shades on the fiber by printing cotton or other suitable material padded with beta naphthol with a printing paste containing a tetrazodiphenolether salt in the manner hereinbefore described.

3. As a new article of manufacture the dye-stuff as a substance or in the fiber having the formula:

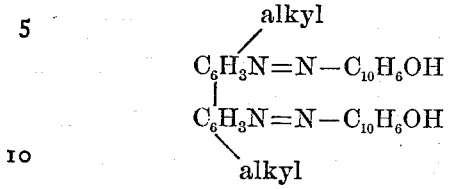

which dye-stuff is insoluble in cold and hot water, nearly insoluble in alcohol soluble in concentrated sulfuric acid with a blue color, bluish-violet flakes being precipitated when the solution is mixed with ice-water.

In testimony whereof I have signed my name in the presence of two subscribing witnesses.

CARL DUISBERG.

Witnesses:
   AUGUST BLANK,
   THILO KROEBER.